(12) United States Patent
Takami

(10) Patent No.: US 9,154,771 B2
(45) Date of Patent: Oct. 6, 2015

(54) APPARATUS FOR CAPTURING STEREOSCOPIC IMAGE

(75) Inventor: Etsuya Takami, Yokohama (JP)

(73) Assignee: JVC KENWOOD CORPORATION (JP)

( * ) Notice: Subject to any disclaimer, the term of this patent is extended or adjusted under 35 U.S.C. 154(b) by 505 days.

(21) Appl. No.: 13/643,593

(22) PCT Filed: Feb. 22, 2011

(86) PCT No.: PCT/JP2011/053859
§ 371 (c)(1),
(2), (4) Date: Oct. 26, 2012

(87) PCT Pub. No.: WO2011/135904
PCT Pub. Date: Nov. 3, 2011

(65) Prior Publication Data
US 2013/0038682 A1    Feb. 14, 2013

(30) Foreign Application Priority Data

Apr. 28, 2010    (JP) .................................. 2010-102965

(51) Int. Cl.
*H04N 13/00*    (2006.01)
*H04N 13/02*    (2006.01)
*G06T 7/00*    (2006.01)
*H04N 13/04*    (2006.01)
*G03B 35/08*    (2006.01)

(52) U.S. Cl.
CPC ............ *H04N 13/0246* (2013.01); *G03B 35/08* (2013.01); *G06T 7/002* (2013.01); *H04N 13/025* (2013.01); *H04N 13/0239* (2013.01); *H04N 13/0425* (2013.01); *H04N 2213/001* (2013.01)

(58) Field of Classification Search
CPC ................. G03B 35/08; H04N 13/025; H04N 2213/001; H04N 13/0239; H04N 13/0246; H04N 13/0425; G06T 7/002
See application file for complete search history.

(56) References Cited

U.S. PATENT DOCUMENTS

2006/0215021 A1*    9/2006    Suto et al. ..................... 348/139

FOREIGN PATENT DOCUMENTS

| JP | 2004126905 | 4/2004 |
| JP | 2005072674 | 3/2005 |
| JP | 2006162991 | 6/2006 |
| JP | 2006276743 | 10/2006 |

OTHER PUBLICATIONS

International Search Report—PCT/JP2011/053859 dated May 10, 2011.

* cited by examiner

*Primary Examiner* — Sath V Perungavoor
*Assistant Examiner* — Xiaolan Xu
(74) *Attorney, Agent, or Firm* — Cantor Colburn LLP

(57) ABSTRACT

An apparatus for capturing a stereoscopic image maintains the image quality of partial image data by appropriately cutting out the partial image data from image data generated by an imaging unit. The apparatus includes imaging units which generate right-eye image data and left-eye image data having binocular parallax for making a viewer sense a stereoscopic image; an information storage unit which stores, when image center points of the right-eye and left-eye image data image data are origins, position information indicating positions of right and left correction points obtained by moving marks projected on the right-eye and left-eye image data by a differential vector, respectively; and a cutout control unit which, based on the position information, cuts out pieces of partial image data having the same size from the right-eye and left-eye image data.

4 Claims, 14 Drawing Sheets

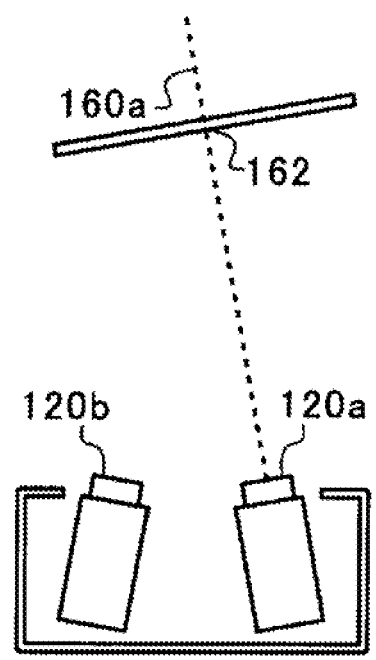

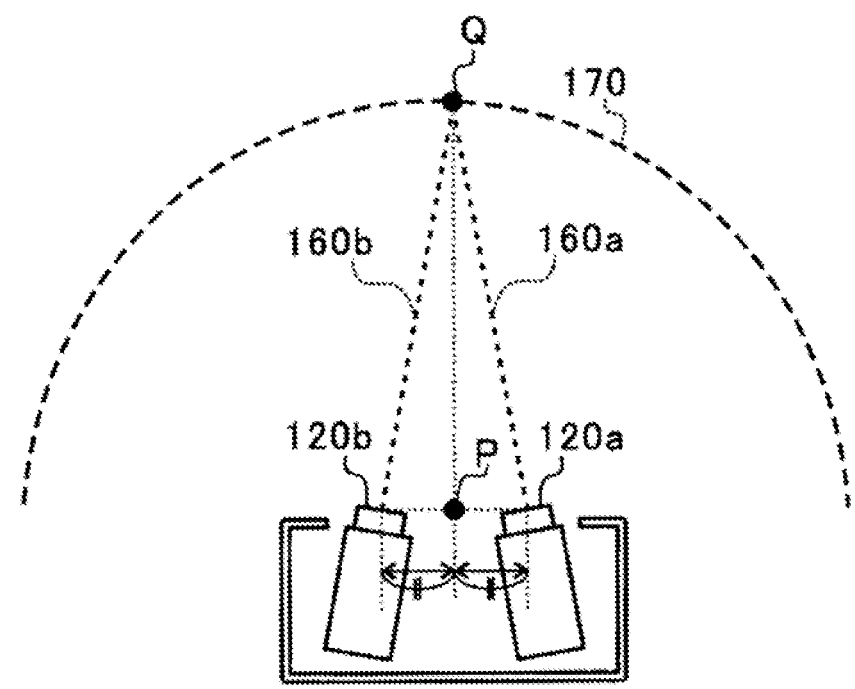

FIG. 10
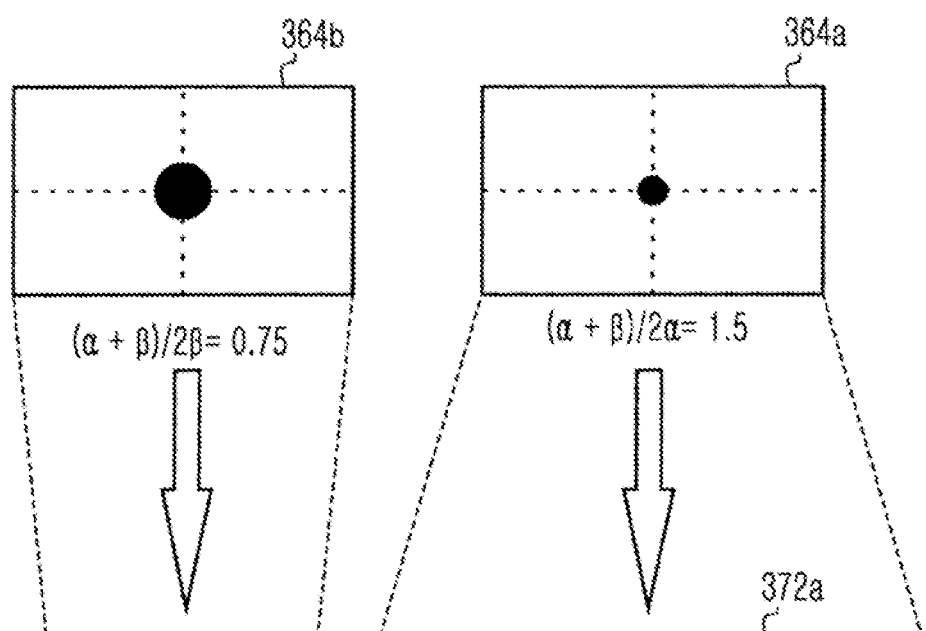
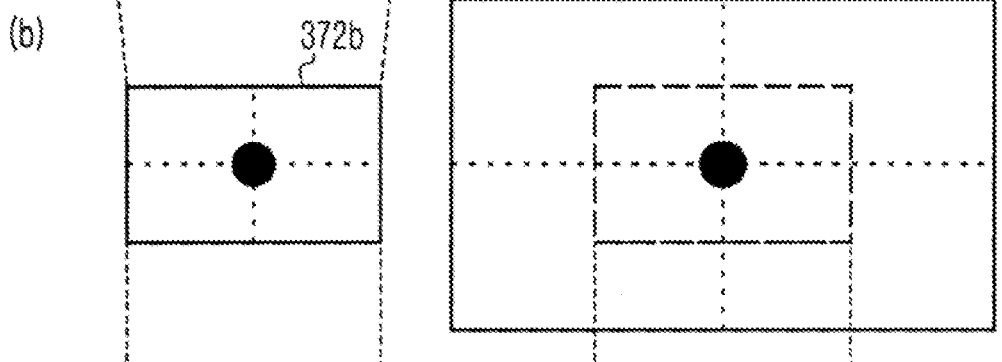
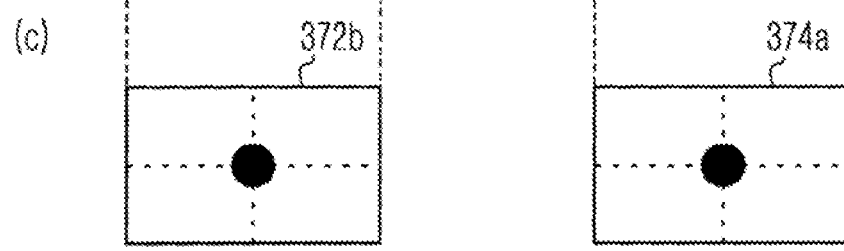

APPARATUS FOR CAPTURING STEREOSCOPIC IMAGE

TECHNICAL FIELD

The present invention relates to an apparatus for capturing a stereoscopic image which a viewer may sense due to binocular disparity.

BACKGROUND ART

Recently, a technology of making a viewer sense a stereoscopic image (a three-dimensional (3D) image) by viewing, from among two images having binocular disparity, a right-eye image with the right eye and a left-eye image with the left eye has generally spread. An apparatus for capturing a stereoscopic image which generates a right-eye image and a left-eye image to make a viewer sense a stereoscopic image tends to include two imaging units in order to generate the right-eye image and the left-eye image.

However, since a precision at which the two imaging units or lenses constituting the two imaging units are formed or assembled varies according to devices, there may exist a difference between an imaging axis set during design and an actual imaging axis in each of the two imaging units, or there may exist a magnification difference between the two imaging units. Accordingly, due to two pieces of image data generated by the two imaging units, an observer may not correctly observe a stereoscopic image. An imaging axis refers to an imaging direction and corresponds to the center of an image (image center) generated by an imaging unit. Such a difference between a set imaging axis and an actual imaging axis or a magnification difference may be corrected by directly adjusting hardware or adjusting a cutout range of obtained image data.

For example, a technology of setting, for image data generated by one imaging unit, a cutout range for cutting out the image data by using an actual imaging axis of one imaging unit as a center, and setting, for image data generated by the other imaging unit, a cutout range by moving a center during cutout (cutout center) by as much as a difference between an actual imaging axis of the other imaging unit and the actual imaging axis of the one imaging unit is disclosed (for example, Patent Reference 1).

However, when a difference between a set imaging axis and an actual imaging axis is corrected by adjusting a cutout range and a cutout center during cutout from image data, the cutout range is limited to a range of the image data. Accordingly, when image data of only one imaging unit is deviated from the cutout center, the cutout range is limited by the deviated cutout center and a range of the image data.

PRIOR ART REFERENCE

Patent Reference (Patent Reference 1) Japanese Laid-Open Patent Publication No, 2006-162991

DISCLOSURE OF THE INVENTION

Technical Problem

The present invention provides an apparatus for capturing a stereoscopic image which may maintain the image quality of partial image data by appropriately cutting out the partial image data from image data generated by an imaging unit.

Technical Solution

According to an aspect of the present invention, an apparatus for capturing a stereoscopic image includes: imaging units which generate right-eye image data and left-eye image data having binocular parallax for making a viewer sense a stereoscopic image; an information storage unit which stores, when image center points of the right-eye image data and the left-eye image data are origins, position information indicating a position of a right correction point obtained by moving a mark projected on the right-eye image data by a differential vector and a position of a left correction point obtained by moving a mark projected on the left-eye image data by the differential vector, wherein the differential vector is a vector having a center point of a connection line that connects the marks projected on the right-eye image data and the left-eye image data as an initial point and the image center points as terminal points; and a cutout control unit which, based on the position information, cuts out pieces of partial image data having the same size by using the right correction point as a cutout center from the right-eye image data and the left correction point as a cutout center from the left-eye image data.

The imaging units may include lenses capable of magnifying and reducing a subject to be photographed on an imaging axis for generating the right-eye image data and an imaging axis for generating the left-eye image data, the information storage unit may store the position information when the lenses are set to have a plurality of different magnifications, in relation to the magnifications, and the cutout control unit may obtain a magnification of a current lens, and based on position information in relation to the magnification of the current lens, cut out pieces of partial image data having the same size from the right-eye image data and the left-eye image data.

The imaging units may include lenses capable of magnifying and reducing a subject to be photographed on an imaging axis for generating the right-eye image data and an imaging axis for generating the left-eye image data, the information storage unit may store ratio information indicating a dimension ratio of the same subject to be photographed projected on the right-eye image data and the left-eye image data generated by the imaging unit, and the cutout control unit may multiply an average value, which is obtained by dividing a sum of a ratio indicated by the ratio information and 1 by 2, by any one of the right-eye image data and the left-eye image data, multiply a value obtained by dividing the average value by the ratio by the image data not divided by the average value, and cut out pieces of partial image data having the same size from the image data divided by the average value and the image data divided by the value obtained by dividing the average value by the ratio.

The information storage unit may store the ratio information when the lenses are set to have a plurality of different magnifications, in relation to the magnifications, and the cutout control unit may obtain a magnification of a current lens, and based on ratio information in relation to the magnification of the current lens, cut out pieces of partial image data having the same size from the image data divided by the average value and the image data divided by the value obtained by dividing the average value by the ratio.

Advantageous Effects

As described above, the present invention may maintain the image quality of partial image data by appropriately cutting out the partial image data from image data generated by an imaging unit.

BRIEF DESCRIPTION OF THE DRAWINGS

FIGS. 3A through 3C are view for explaining means for generating position information of a correction value generating unit.

FIG. 5 is a view for explaining the means for generating position information of the correction value generating unit.

FIG. 10 is a view for explaining the detailed operation of magnification/reduction correction of the cutout processing unit.

BEST MODE FOR CARRYING OUT THE INVENTION

Embodiment for Carrying out the Invention

Figure 1A:
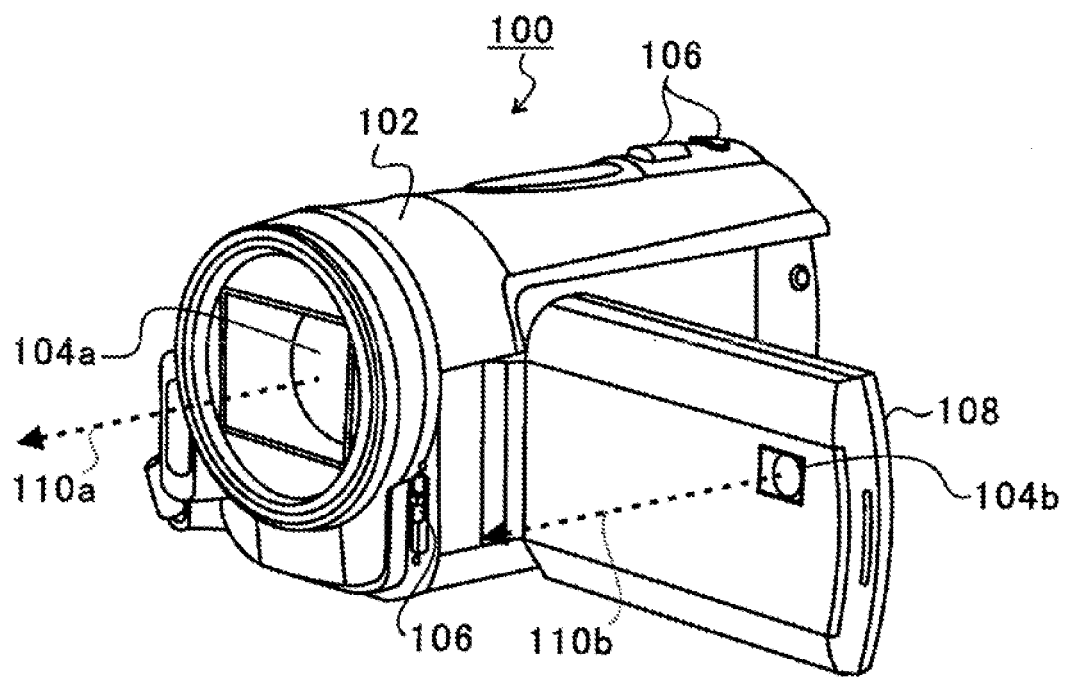
FIGS. 1A and 1B are perspective views showing an outer appearance of an apparatus for capturing a stereoscopic image, according to a first embodiment of the present invention.

Embodiments of the present invention will be explained in detail with reference to the attached drawings. In the embodiments, sizes, materials, and other specific numerical values are just exemplarily shown for easy understanding of the present invention and unless defined otherwise, do not limit the present invention. Also, in the specification and the drawings, elements having substantially the same functions and structures are denoted by the same reference numerals and a repeated explanation thereof will not be given, and elements not directly related to the present invention will not be shown.

First Embodiment

Apparatus 100 for Capturing Stereoscopic Image

Figure 1B:
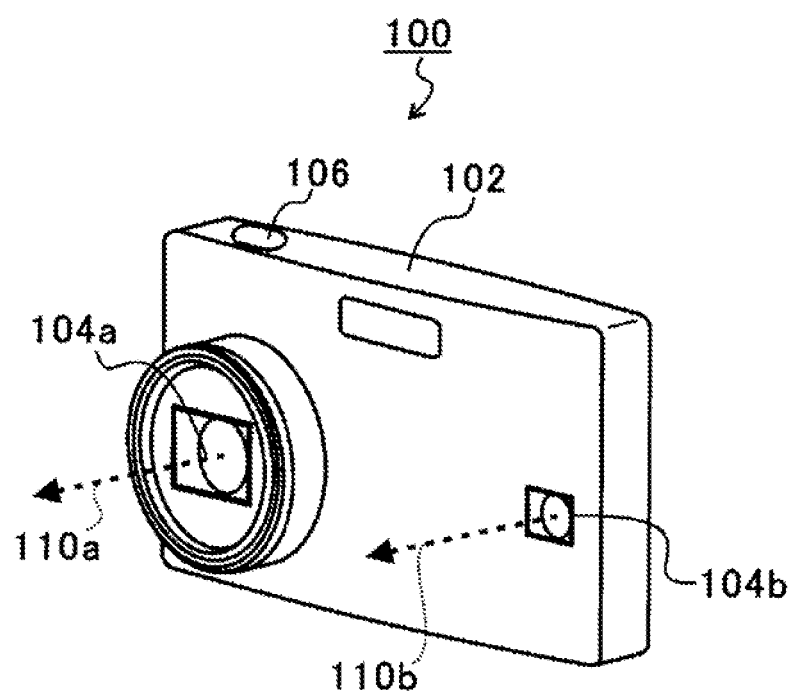

FIGS. 1A and 1B are perspective views showing an outer appearance of an apparatus 100 for capturing a stereoscopic image, according to a first embodiment of the present invention. FIG. 1A shows a video camera as the apparatus 100 and FIG. 1B shows a so-called digital still camera as the apparatus 100. The apparatus 100 may have portability, and includes a main body 102, two imaging lenses 104a and 104b, a manipulation unit 106, and a display unit (viewfinder) 108.

In the video camera as the apparatus 100 shown in FIG. 1A, since the display unit 108 may be opened or closed, the apparatus 100 may have a compact structure by folding the display unit 108 when an image is not captured. By providing the imaging lens 104b on a rear surface of the display unit 108, the apparatus 100 may be prevented from having a large size and a sufficient base line length between the imaging lenses 104a and 104b may be guaranteed.

When a user horizontally holds the main body 102 of the apparatus 100, imaging axes 110a and 110b of an imaging unit of the apparatus 100 are parallel to each other or cross each other in imaging directions on the same horizontal plane as shown in FIG. 1A. The imaging axes 110a and 110b indicate the imaging directions, and are lines extending in the imaging directions from a center point of an image (image center point) generated by the imaging unit.

The apparatus 100 records two pieces of image data (right-eye image data and left-eye image data) having binocular parallax for making a viewer sense a stereoscopic image, generated by using the two imaging lenses 104a and 104b, in a predetermined method for making a viewer sense a stereoscopic image such as a side-by-side method, a top-and-bottom method, a line sequential method, or a frame sequential method, and adjusts an imaging timing or a viewing angle according to a manipulation input of the user through the manipulation unit 106. Also, the apparatus 100 receives an input for changing an imaging mode such as an outdoor mode, an indoor mode, or a night scene mode from the user and performs image processing corresponding to the input.

The apparatus 100 generally includes two imaging units, and one imaging unit generates right-eye image data to be viewed with the right eye and the other imaging unit generates left-eye image data to be viewed with the left eye. However, since a precision at which the two imaging units or the imaging lenses 104 provided on the two imaging units are formed or assembled varies according to devices, there may exist a difference between a set imaging axis and an actual imaging axis in each of the two imaging units, or there may exist a magnification difference between the two imaging units. If no additional processing is performed, the user (or viewer) may not correctly capture a stereoscopic image due to the two pieces of image data. Accordingly, the apparatus 100 of the present embodiment may maintain the image quality of partial image data by appropriately cutting out the partial image data from image data generated by an imaging unit. The apparatus 100 will now be explained.

Figure 2:
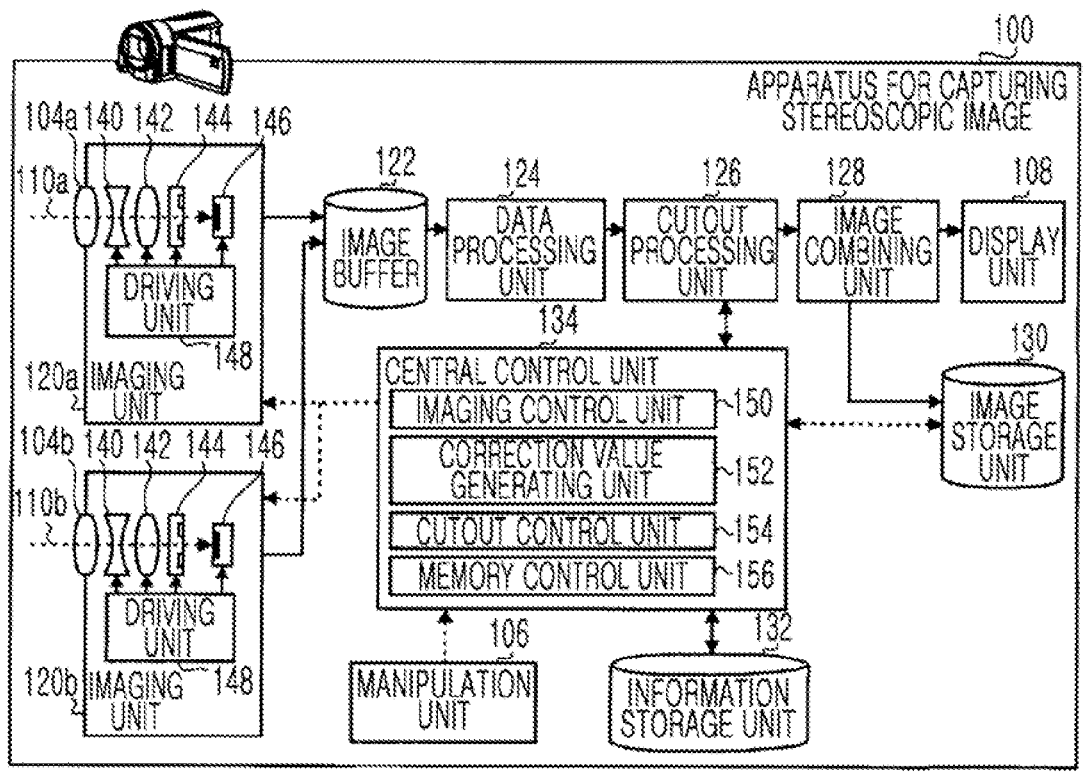
FIG. 2 is a functional block diagram showing a schematic structure of the apparatus.

FIG. 2 is a functional block diagram showing a schematic structure of the apparatus 100. The video camera of FIG. 1A is shown as the apparatus 100. As shown in FIG. 2, the apparatus 100 includes the manipulation unit 106, two imaging units 120a and 120b (shown in FIG. 2, and collectively referred to imaging units 120), an image buffer 122, a data processing unit 124, a cutout processing unit 126, an image combining unit 128, the display unit 108, an image storage unit 130, an information storage unit 132, and a central control unit 134. In FIG. 2, a solid line indicates the flow of data and a dashed line indicates the flow of a control signal.

The manipulation unit 106 includes a manipulation key including a remote shutter release switch, a cross key, a joystick, and a switch such as a touch panel overlapped on a display surface of the display unit 108, and receives a manipulation input of the user.

The imaging units 120 are disposed such that the imaging axes 110a and 110b are parallel to each other or cross at an arbitrary convergence point in imaging directions as described above. When image data generation (recording) is selected according to a manipulation input of the user through the manipulation unit 106, the imaging unit 120a generates right-eye image data and the imaging unit 120b generates left-eye image data, and the imaging units 120a and 120b output the right-eye image data and the left-eye image data to the image buffer 122.

In detail, the imaging units 120 include the imaging lenses 104a and 104b (shown in FIG. 2, and collectively referred to as imaging lenses 104), a zoom lens (variable power lens) 140 capable of magnifying and reducing a subject to be photographed, a focus lens 142 used to adjust a focus, an iris 144 used to adjust light exposure, an imaging element 146 that photoelectrically converts light incident through the imaging lens 104 into electrical data (image data), and a driving unit 148 that drives the zoom lens 140, the focus lens 142, the iris 144, and the imaging element 146 according to a control signal of an imaging control unit 150 which will be explained below. The imaging units 120 generate two pieces of image data along the two imaging axes 110a and 110b. Also, in the present embodiment, since the two imaging units 120 interwork with each other, the two imaging units 120 simultaneously drive (synchronize) the zoom lenses 140, the focus lenses 142, the irises 144, and the imaging elements 146, according to a control signal of the imaging control unit 150.

The image buffer 122 includes a flash memory or a random access memory (RAM), and temporarily stores the right-eye image data generated by the one imaging unit 120a and the left-eye image data generated by the other imaging unit 120b in units of frames.

The data processing unit 124 performs imaging signal processing such as red (R), green (G), and blue (B) processing (e.g., γ correction or color correction), enhancement processing, or noise reduction processing on the right-eye image data and the left-eye image data output from the image buffer 122.

The cutout processing unit 126 performs imaging axis correction that corrects an imaging axis by cutting out part of image data having been subjected to image signal processing by the data processing unit 124; or magnification/reduction correction that corrects a magnification/reduction ratio, and outputs a result to the image combining unit 128, under the control of a cutout control unit 154 which will be explained below. The imaging axis correction or the magnification/reduction correction performed by the cutout processing unit 126 will be explained in detail below. Also, the image combining unit 128 may be disposed before the cutout processing unit 126.

The image combining unit 128 combines the right-eye image data with the left-eye image data output from the cutout processing unit 126, generates combined data in a predetermined method for making a viewer sense a stereoscopic image such as a side-by-side method, a top-and-bottom method, a line sequential method, or a frame sequential method, and outputs the combined data to the display unit 108 or the image storage unit 130.

The display unit 108 includes a liquid crystal display or an electro luminescence (EL) display, and is not limited to a display or a viewfinder attached to a video camera or a digital still camera but may include any of various other displays. Also, the display unit 108 displays the combined data output from the image combining unit 128. In this case, the display unit 108 may separately display each of the right-eye image data or the left-eye image data constituting the combined data.

Also, when the display unit 108 having polarization that varies line by line based on a polarization display method is used, the image combining unit 128 outputs the combined data by using a line sequential method, and the user wearing polarizing glasses senses the combined data as a stereoscopic image by viewing only the right-eye image data with the right-eye and only the left-eye image data with the left eye. Also, as long as the display unit 108 is formed to make the user sense a stereoscopic image, a display method is not limited to a line sequential method, and may be for example, a frame sequential method that alternately displays a right-eye image and a left-eye image frame by frame and causes the right-eye image and the left-eye image to be viewed through electronic shutter glasses or a lenticular method that controls a direction in which light of each of a right-eye image and a left-eye image travels by using a lenticular lens.

The user may grasp a subject with a desired occupation area at a desired position by manipulating the manipulation unit 106 while viewing an image displayed on the display unit 108.

The image storage unit 130 includes a hard disc drive (HDD), a flash memory, or a nonvolatile RAM, and stores the combined data output from the image combining unit 128 according to a control signal of a memory control unit 156. Also, the image storage unit 130 may be a device for storing the combined data in a detachable storage medium such as an optical disc medium such as a compact disc (CD), a digital versatile disc (DVD), or a Blu-ray disc (BD), or a portable memory card. In this case, the image storage unit 130 may encode the image data by using a predetermined encoding method such as M-JPEG, MPEG-2, or H.264.

The information storage unit 132 includes an electrically erasable programmable read-only memory (EEPROM), a programmable read-only memory (PROM), or a nonvolatile RAM, and previously stores position information generated by a correction value generating unit 152 which will be explained below, for example, during shipment from a factory. The information storage unit 132 previously stores position information when the zoom lens 140 and the focus lens 142 are set to have a plurality of different magnifications, in relation to the magnifications. The position information indicates, when image center points of the right-eye image data and the left-eye image data are origins, a position of a right correction point obtained by moving a mark projected on the right-eye image data by a differential vector and a position of a left correction point obtained by moving a mark projected on the left-eye image data by the differential vector. The differential vector is a vector having a center point of a connection line that connects the marks projected on the right-eye image data and the left-eye image data as an initial point and the image center points as terminal points. Means for generating the position information of the correction value generating unit 152 will be explained below in detail.

The central control unit 134 manages and controls the overall apparatus 100 by using a semiconductor integrated circuit including a central processing unit (CPU), a ROM in which a program or the like is stored, and a RAM as a work area. Also, in the present embodiment, the central control unit 134 functions as the imaging control unit 150, the correction value generating unit 152, the cutout control unit 154, and the memory control unit 156.

The imaging control unit 150 controls the imaging units 120 according to a manipulation input of the user, that is, information supplied from the manipulation unit 106. For example, the imaging control unit 150 controls the driving unit 148 to drive the zoom lens 140, the focus lens 142, the iris 144, and the imaging element 146, so as to obtain appropriate image data. Also, when a zoom function (magnification changing function) is performed, the imaging control unit 150 controls the driving unit 148 to move the zoom lens 140 and the focus lens 142.

The correction value generating unit 152 generates position information used when the cutout control unit 154 performs imaging axis correction, and causes the position information to be stored in the information storage unit 132.

FIGS. 3A through 5 are views for explaining the means for generating position information of the correction value generating unit 152. As described above, a precision at which the two imaging units 120 each including the imaging lens 104, the zoom lens 140, and the focus lens 142 are formed or assembled, and the driving unit 148 including a lens driving motor vary according to devices. Accordingly, there exists a difference between a reference imaging axis, that is, an imaging axis set when the apparatus 100 is designed (hereinafter, simply referred to as a reference axis) and an actual imaging axis (hereinafter, simply referred to as an actual imaging axis) 110a and 110b. Since the difference varies according to the imaging units 120, there exists a difference between the two imaging units 120.

Figure 3B:
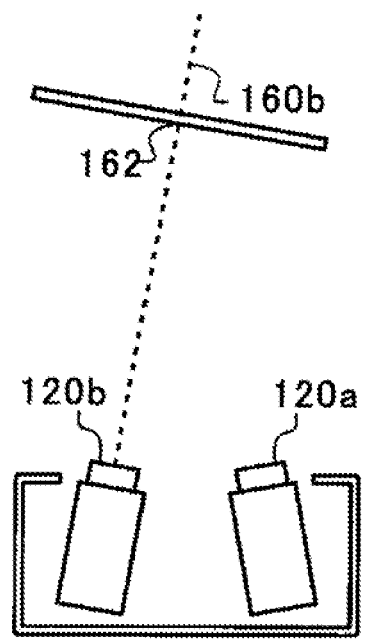
Figure 3C:
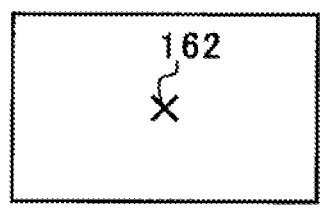

Accordingly, in order to reduce a differential between a difference between a reference axis and an actual imaging axis of the one imaging unit 120a and a difference between a reference axis and an actual imaging axis of the other imaging unit 120b, the correction value generating unit 152 calculates a position of a mark projected on the right-eye image data and a position of a mark projected on the left-eye image data when image center points (points indicating the actual imaging axes) of the right-eye image data and the left-eye image data are origins. In detail, as shown in FIGS. 3A and 3B, a mark 162 as shown in FIG. 3C is formed on each of reference axes 160a and 160b of the imaging units 120a and 120b. Imaging is performed by setting the zoom lens 140 and the focus lens 142 to have predetermined magnifications, and the correction value generating unit 152 calculates a position of the mark 162 projected on the right-eye image data and a position of the mark 162 projected on the left-eye image data when image center points of the right-eye image data and the left-eye image data generated by the imaging units 120a and 120b are origins. The mark 162 may be formed on any of the positions on the reference axes 160a and 160b. Although the mark 162 is indicated by "X", the present embodiment is not limited thereto and the mark 162 may be any mark if the mark 162 may be represented as a point on a reference axis.

Figure 4A:
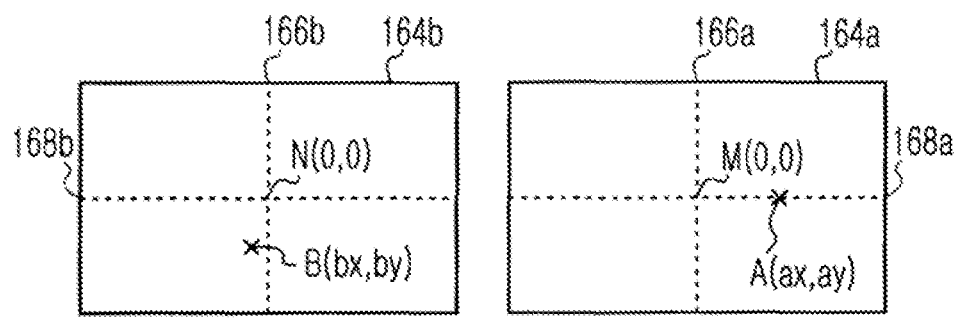
FIGS. 4A through 4C are views for explaining the means for generating position information of the correction value generating unit.

In this case, when the imaging units 120a and 120b generate right-eye image data 164a and left-eye image data 164b as shown in FIG. 4A, a mark A projected on the right-eye image data 164a (which is obtained by projecting the mark 162 on the right-eye mage data 164a) is deviated rightward from an image center point M of the right-eye image data 164a which is a point indicating an actual imaging axis of the imaging unit 120a, when viewed from a front surface. The image center point M is an intersection point between a vertical center line 166a and a horizontal center line 168a of the right-eye image data 164a. Since the mark 162 is formed on a reference axis, a point indicating the reference axis in the right-eye image data 164a is deviated rightward from the image center point M of the right-eye image data 164a when viewed from the front surface (to be precise, the actual imaging axis of the imaging unit 120a is deviated from the reference axis). Also, a mark B projected on the left-eye image data 164b (which is obtained by projecting the mark 162 on the left-eye image data 164b) is deviated downward and leftward from an image center point N of the left-eye image data 164b which is a point indicating an actual imaging axis of the imaging unit 120b, when viewed from the front surface. The image center point N is an intersection point between a vertical center line 166b and a horizontal center line 168b of the left-eye image data 164b. Since the mark 162 is formed on a reference axis, a point indicating the reference axis in the left-eye image data 164b is deviated downward and leftward from the image center point N of the left-eye image data 164b when viewed from the front surface (to be precise, the actual imaging axis of the imaging unit 120b is deviated from the reference axis).

Accordingly, the correction value generating unit 152 calculates a position of the mark A (point indicating the reference axis) projected on the right-eye image data 164a when the image center point. M of the right-eye image data 164a which is a point indicating the actual imaging axis shown in FIG. 4A is an origin. Likewise, the correction value generating unit 152 calculates a position of the mark B (point indicating the reference axis) projected on the left-eye image data 164b when the image center point. N of the left-eye image data 164b which is a point indicating the actual imaging axis shown in FIG. 4A is an origin. Assuming that an origin is an image center point and positions of the mark A and the mark B are indicated by xy coordinates (x, y), xy coordinates of the mark A (hereinafter, simply referred to as a reference point A) projected on the right-eye image data 164a become (ax, ay), and xy coordinates of the mark B (hereinafter, simply referred to as a reference point B) projected on the left-eye image data 164b become (bx, by). An x coordinate is a coordinate in a horizontal direction of a screen and a y coordinate is a coordinate in a vertical direction of a screen.

Figure 4B:
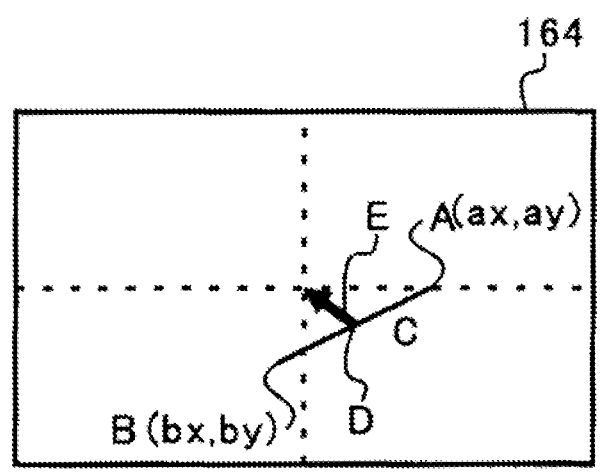
Figure 4C:
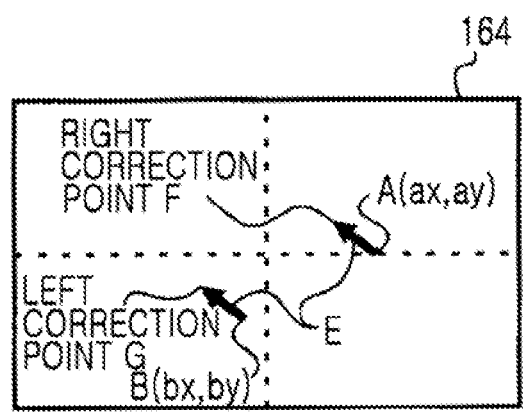

Also, as shown in FIG. 4B, the correction value generating unit 152 derives a differential vector E having a center point D of a connection line C that connects the calculated reference point A and the calculated reference point B as an initial point and the image center points (origins) as terminal points. When the xy coordinates of the reference point A are (ax, ay) and the xy coordinates of the reference point B are (bx, by), assuming that an origin is an image center point and xy coordinates are indicated by (x, y), xy coordinates of the center point. D may be ((ax+bx)/2, (ay+by)/2). Accordingly, the differential vector E may be a vector having ((ax+bx)/2, (ay+by)/2) as an initial point and the origin (0, 0) as a terminal point.

The correction value generating unit 152 generates position information indicating a position of a right correction point obtained by moving the reference point A by the differential vector E and a position of a left correction point obtained by moving the reference point B by the differential vector E, and causes the position information to be stored in the information storage unit 132. When xy coordinates of the reference point A are (ax, ay), xy coordinates of the reference point B are (bx, by), an initial point of the differential vector E is ((ax+bx)/2, (ay+by)/2)), and a terminal point of the differential vector E is an origin (0, 0), a right correction point F becomes (ax−(ax+bx)/2, ay−(ay+by)/2)) and a left correction point G becomes (bx−(ax+bx)/2, by−(ay+by)/2)).

Also, the correction value generating unit 152 sets magnifications of the zoom lens 140 and the focus lens 142 to be a plurality of levels, for example, 3 or 4 levels, and calculates positions of the right correction point F and a position of the left correction point G of image data 164 at each of the set plurality of different magnifications.

The correction value generating unit 152 causes the information storage unit 132 to store position information indicating the positions of the calculated right correction point F and the position of the calculated left correction point G, in relation to the magnifications of the zoom lens 140 and the focus lens 142 when the image data is imaged, used when the position of the right correction point F and the position of the left correction point G are calculated. Also, the correction value generating unit 152 obtains position information at magnifications at which the position of the right correction point F and the position of the left correction point G are not calculated by linearly interpolating the position of the right correction point F at the plurality of magnifications of the zoom lens 140 and the focus lens 142 stored in the information storage unit 132 and linearly interpolating the position of the left correction point G at the plurality of magnifications of the zoom lens 140 and the focus lens 142 stored in the information storage unit 132. Also, an interpolation method is not limited to linear interpolation, and may be any of other interpolation methods such as interpolation using a spline function.

Also, in the present embodiment, by previously storing position information before shipment in the information storage unit 132 and correcting a cutout center of image data by using the position information, the correction value generating unit 152 enables a difference between a reference axis and an actual imaging axis of right-eye image data and a difference between a reference axis and an actual imaging axis of a left-eye image data generated by the apparatus 100 to be substantially the same.

Also, although the mark 162 is formed on a reference axis in FIG. 3, the present embodiment is not limited thereto and as shown in FIG. 5, when the mark 162 may be formed at a point that is disposed between the imaging unit 120a and the imaging unit 120b, disposed on a circumference 170 of a circle having a point P which is equally distanced from the imaging units 120 as a center and a distance from the point P to a convergence point. Q as a radius, and disposed within viewing angles of the imaging units 120. In this case, since the mark 162 does not need to be formed twice when imaging is performed by using the imaging unit 120a and when imaging is performed by using the imaging unit 120b, operability may be improved and also a difference between two imaging units on reference axes due to a difference occurring when a mark is formed may be reduced.

The cutout control unit 154 controls the cutout processing unit 126 to cut out pieces of partial image data having the same size by using the right correction point F as a cutout center from the right-eye image data 164a and the left correction point G as a cutout center from the left-eye image data 164b, based on the position information stored in the information storage unit 132.

Figure 6A:
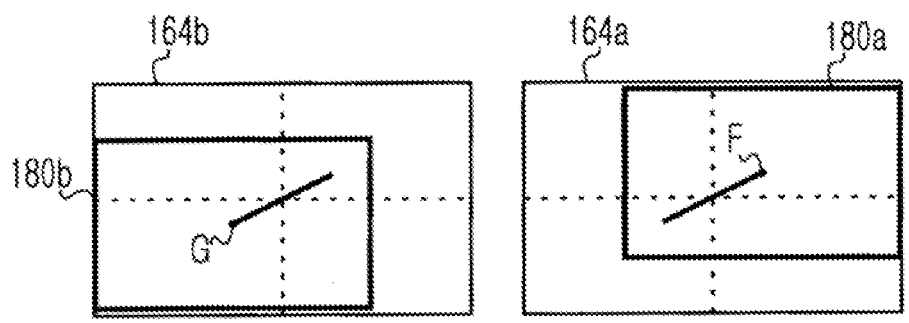
FIGS. 6A and 6B are views for explaining a detailed operation of imaging axis correction of a cutout processing unit.
Figure 6B:
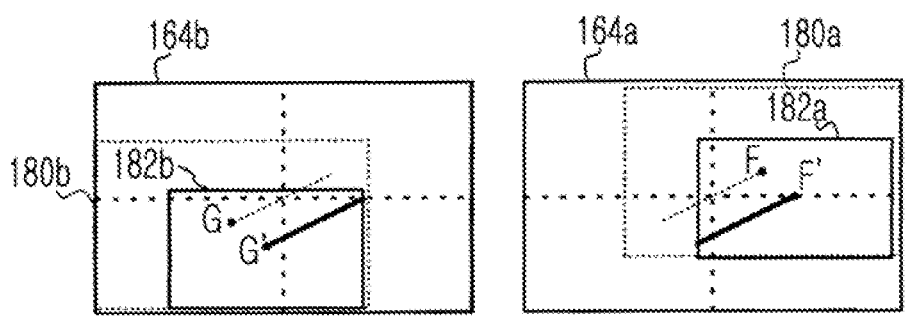

FIGS. 6A and 6B are views for explaining a detailed operation of imaging axis correction of the cutout processing unit 126. When the cutout processing unit 126 cuts out partial image data 180a from the right-eye image data 164a as shown in FIG. 6A, the cutout processing unit 126 cuts out the partial image data 180a by using the right correction point F as a cutout center under the control of the cutout control unit 154. Likewise, when the cutout processing unit 126 cuts out partial image data 180b from the left-eye image data 164b, the cutout processing unit 126 cuts out the partial image data 180b by using the left correction point G as a cutout center under the control of the cutout control unit 154. The cutout processing unit 126 cuts out the pieces of partial image data 180a and 180b such that the partial image data 180a and the partial image data 180b have a size of the same aspect ratio (for example, 16:9).

The cutout processing unit 126 magnifies/reduces the cutout pieces of partial image data 180 by using a method of the image combining unit 128. For example, when the number of pixels of the right-eye image data 164a and the left-eye image data 164b generated by the imaging element 146 is 3840×2160 and a method of the image combining unit 128 is a 1920×1080 side-by-side method, the cutout processing unit 126 respectively cuts out the partial image data 180a and the partial image data 180b each having 1920×1080 pixels from the right-eye image data 164a and the left-eye image data 164b, and generates the partial image data 180a and the partial image data 180b each having 1920×540 pixels by compressing the number of pixels in a horizontal direction.

Meanwhile, as shown in FIG. 6B, when two cutout centers are independently deviated, that is, when pieces of partial image data 182a and 182b are cut out by using a right correction point and a left correction point G' as cutout centers in FIG. 6B, an allowed amount of a cutout range in a vertical direction and an allowed amount of the cutout range in a horizontal direction are limited by one image data. In FIG. 6B, a cutout range of the partial image data 182b in the vertical direction is limited by the left-eye image data 164b and a cutout range of the partial image data 182a is also limited to match with the cutout range of the partial image data 182b, thereby reducing the pieces of partial image data 182a and 182b.

Since the cutout control unit 154 of the present embodiment moves a cutout center by as much as a value obtained by proportionally dividing a differential between a difference between a reference axis and an actual imaging axis of the imaging unit 120a and a difference between a reference axis and an actual imaging axis of the imaging unit 120b for any of the two pieces of image data 164, that is, the right-eye image data 164a and the left-eye image data 164b, allowed amounts of a cutout range in vertical and horizontal directions become the same for the two pieces of image data 164. Accordingly, compared to a case where cutout centers are independently deviated for the two pieces of image data 164 shown in FIG. 6B, a maximum interval between a range of the image data 164 and a cutout center may be guaranteed and a cutout range may be increased.

The memory control unit 156 controls the image storage unit 130 to store the partial image data cut out by the cutout processing unit 126 under the control of the cutout control unit 154.

As described above, the apparatus 100 according to the present embodiment may maintain the image quality of partial image data by appropriately cutting out the partial image data from image data generated by an imaging unit.

Also, although the apparatus 100 is a two lens camera that generates image data by using two imaging units 120, an adaptor for capturing a stereoscopic image which simultaneously photographs one subject from two view points by using an optical method such as a mirror using method may be provided in front of an imaging unit on an optical path and may generate image data. Even in this case, the image quality of partial image data may be maintained by appropriately cutting out the partial image data from image data generated by an imaging unit by using position information of the present invention.

Second Embodiment

The apparatus 100 of the first embodiment may reduce a differential between a difference between a reference axis and an actual imaging axis of the imaging unit 120a and a difference between a reference axis and an actual imaging axis of the imaging unit 120b when the cutout control unit 154 adjusts a cutout center and a cutout range when the cutout processing unit 126 cuts out image data, based on position information stored in the information storage unit 132. An apparatus 300 for capturing a stereoscopic image which may reduce a magnification difference between right-eye image data and left-eye image data by using an actual magnification difference between the imaging units 120 will now be explained.

Figure 7:
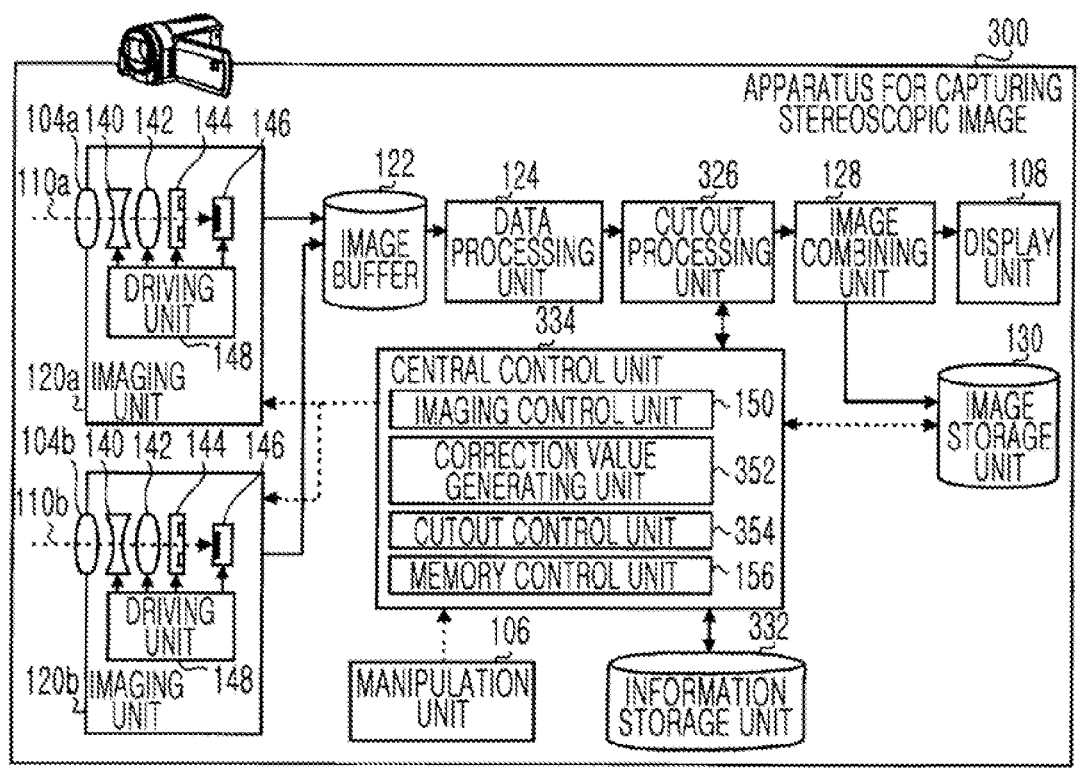
FIG. 7 is a functional block diagram showing a schematic structure of an apparatus for capturing a stereoscopic image, according to a second embodiment of the present invention.

FIG. 7 is a functional block showing a schematic structure of the apparatus 300 according to a second embodiment of the present invention. As shown in FIG. 7, the apparatus 300 includes the manipulation unit 106, two imaging units 120a and 120b (shown in FIG. 7, and collectively referred to as imaging units 120), the image buffer 122, the data processing unit 124, a cutout processing unit 326, the image combining unit 128, the display unit 108, the image storage unit 130, an information storage unit 332, and a central control unit 334. Also, the central control unit 334 functions as the imaging control unit 150, a correction value generating unit 352, a cutout control unit 354, and the memory control unit 156. The manipulation unit 106, the two imaging units 120, the image buffer 122, the data processing unit 124, the image combining unit 128, the display unit 108, the image storage unit 130, the imaging control unit 150, and the memory control unit 156 are substantially the same as those in the first embodiment, and thus a repeated explanation thereof will not be given and the following will focus on the cutout processing unit 326, the information storage unit 332, the correction value generating unit 352, and the cutout control unit 354, which are different from those in the first embodiment.

Under the control of the cutout control unit 354 which will be explained below, the cutout processing unit 326 cuts out a part of image data on which image signal processing has been performed by the data processing unit 124, performs imaging axis correction or magnification/reduction correction, and then outputs the result to the image combining unit 128. The imaging axis correction performed by the cutout processing unit 326 is substantially the same as the imaging axis correction in the first embodiment, and a detailed operation of the magnification/reduction correction will be explained below in detail. Also, the cutout processing unit 326 of the present embodiment performs imaging axis correction and then magnification/reduction correction. Also, an order of performing the imaging axis correction and the magnification/reduction correction is not specially limited.

The information storage unit 332 includes an EEPROM, a PROM, or a nonvolatile RAM, like the information storage unit 132, and previously stores, for example, during shipment from a factory, ratio information generated by the correction value generating unit 352 which will be explained below, in addition to position information. The ratio information indicates a dimension ratio of the same subject to be photographed projected on right-eye image data and left-eye image data generated by the two imaging units 120a and 120b when a plurality of different magnifications are set, and is previously stored in relation to each of the magnifications.

The correction value generating unit 352 of the central control unit 334 generates the ratio information used when the cutout control unit 354 performs magnification/reduction correction, and causes the ratio information to be stored in the information storage unit 332.

Figure 8A:
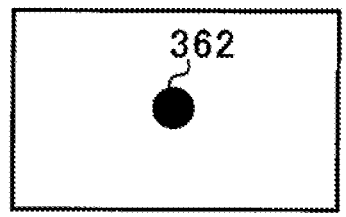
FIGS. 8A through 8C are views for explaining a method of calculating ratio information of a correction value generating unit.
Figure 8B:
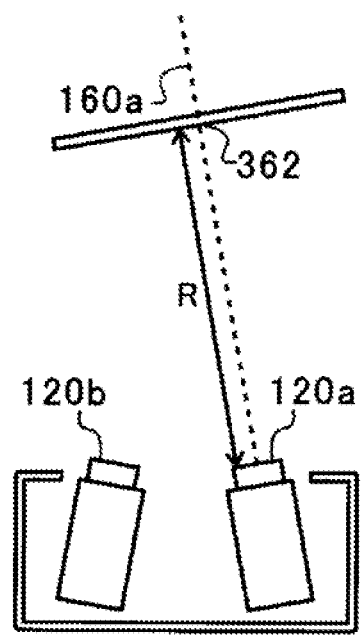
Figure 8C:
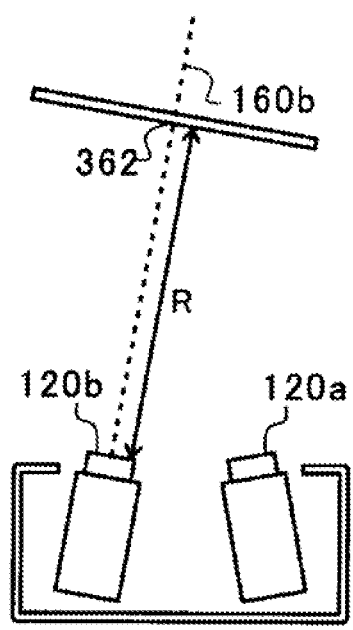

FIGS. 8A through 8C are views for explaining a method of calculating ratio information of the correction value generating unit 352. As described above, a precision at which the two imaging units 120 each including the imaging lens 104, the zoom lens 140, and the focus lens 142 are formed or assembled, and the driving unit 148 such as the lens driving motor vary according to devices. Accordingly, since there exists a difference between a designed magnification (hereinafter, simply referred to as a set magnification) and an actual magnification of image data (hereinafter, simply referred to as an actual magnification) and the difference varies according to the imaging units 120, there exists a deviation difference (hereinafter, referred to as a dimensional difference) between the two imaging units 120.

Accordingly, the correction value generating unit 352 calculates ratio information for reducing a dimensional difference between the two imaging units 120 at a predetermined set magnification. First, by using a mark 362 shown in FIG. 8A, as shown in FIGS. 8B and 8C, the mark 362 is formed at the same distance R from the imaging units 120a and 120b to be perpendicular to the reference axes 160a and 160b of the imaging units 120a and 120b, and is imaged for each imaging unit 120. Since the mark 362 is a circle, an angular difference between the imaging units 120 and the mark 362 due to a rotation about the reference axes 160a and 160b or a rotation about an axis perpendicularly intersecting the reference axes 160a and 160b may be removed, thereby making it possible to calculate the dimensional difference between the imaging units 120 with high precision.

Although the mark 362 is formed on the reference axes 160a and 160b, the present embodiment is not limited thereto, and the mark 362 may be formed at any position that is equally distanced from the imaging units 120 and has the same viewing angle. Also, although the mark 362 is a circle, the present embodiment is not limited thereto and the mark 362 may be any mark as long as a dimension ratio of the same subject to be photographed projected on the right-eye image data and the left-eye image data may be calculated.

The correction value generating unit 352 calculates a ratio $\beta/\alpha$ of a diameter $\alpha$ of a mark projected on the right-eye image data to a diameter $\beta$ of a mark projected on the left-eye image data as a dimension ratio. Also, the correction value generating unit 352 changes a set magnification with a plurality of levels, for example, 3 or 4 levels, calculates a dimension ratio of image data at each of the magnifications, and causes ratio information indicating the dimension ratio to be stored in the information storage unit 332 in relation to the set magnifications when imaging is performed. Also, the correction value generating unit 352 obtains ratio information of set magnifications, at which a dimension ratio is not calculated, by linearly interpolating a dimension ratio at the plurality of set magnifications stored in the information storage unit 332. Also, an interpolation method is not limited to linear interpolation, and may be any interpolation method such as interpolation using a spline function.

Also, in the present embodiment, by previously storing ratio information before shipment in the information storage unit 332 and correcting image data by using the ratio information, the correction value generating unit 352 enables a dimensional difference of image data generated by the apparatus 300 between the two imaging units 120 to be substantially the same.

The cutout control unit 354 controls the cutout processing unit 326 to obtain a current set magnification, multiply an average value, which is obtained by dividing a sum of a ratio $\beta/\alpha$ of ratio information in relation to the current set magnification and 1 by 2, by image data (referred to as first image data, e.g., right-eye image data) on which a mark having a diameter $\alpha$ is projected, multiply a value obtained by dividing the average value by the ratio $\beta/\alpha$ by image data (referred to as second image data, e.g., left-eye image data) on which a mark having a diameter $\beta$ which is image data not multiplied by the average value is projected, and cut out pieces of partial image data having the same size from the image data (right-eye image data) multiplied by the average value and the image data (left-eye image data) multiplied by a value that the average value is divided by the ratio.

Figure 9:
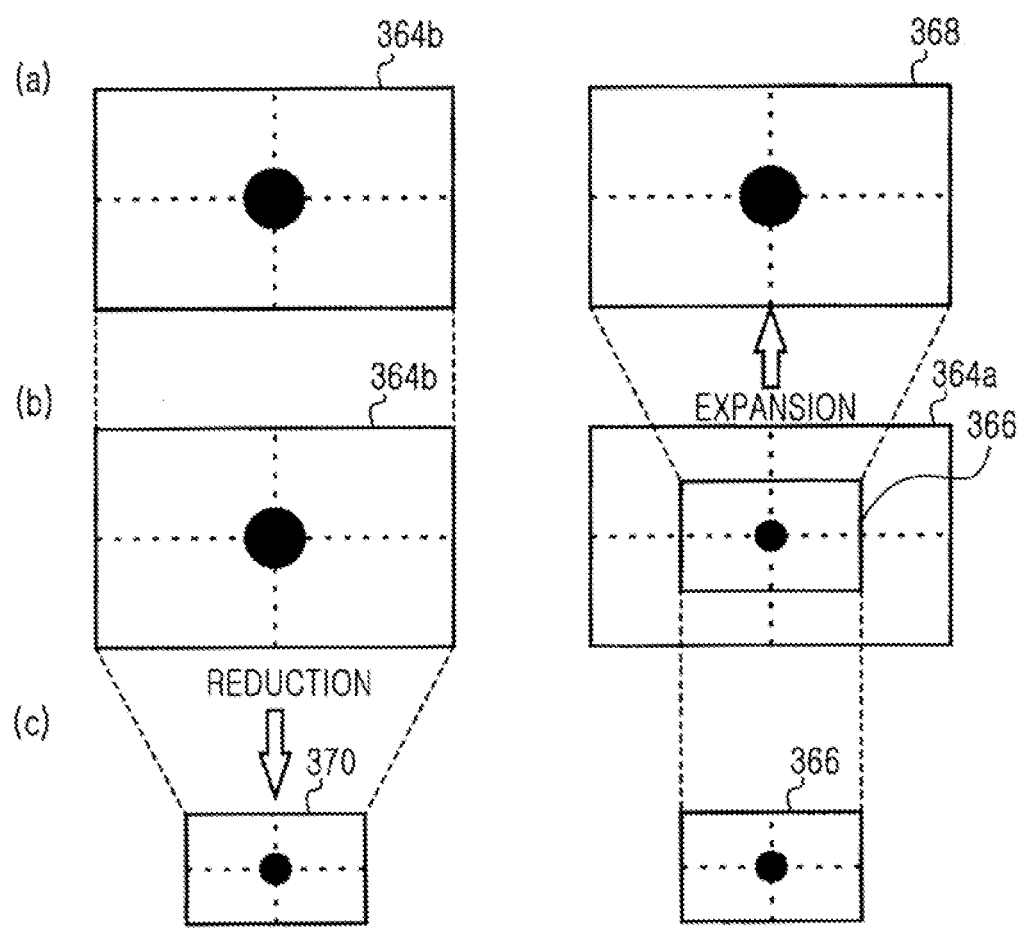
FIG. 9 is a view for explaining a detailed operation of magnification/reduction correction of a cutout processing unit.

FIGS. 9 and 10 are views for explaining a detailed operation of magnification/reduction correction of the cutout processing unit 326. For example, as shown in (b) of FIG. 9, when a diameter $\alpha$ of a subject to be photographed projected on right-eye image data 364a is 1 and a diameter 13 of a subject to be photographed projected on left-eye image data 364b is 2, if only partial image data 366 which is obtained by being cut out from the right-eye image data 364a is magnified four times, an actual information amount (pixels) around ¾ of the partial image data 366 is lost, thereby degrading the image quality of magnified partial image data 368 obtained by magnifying the partial image data 366. The actual information amount refers to an information amount when pixel interpolation is not performed. Accordingly, when the magnified partial image data 368 shown in (a) of FIG. 9 is compared with the left-eye image data 364b, an actual information amount of the magnified partial image data 368 has an actual information amount which is reduced to ¼ and thus the image quality of only the magnified partial image data 368 is degraded. Accordingly, since there exists a difference in image quality between the left-eye image data 346b (having an actual information amount of 1) and the magnified partial image data 368 (having an actual information amount of ¼) viewed with the right-eye, a viewer who senses a stereoscopic image feels clear image quality degradation.

Meanwhile, as shown in (c) of FIG. 9, in order to make the same the diameter α of the subject to be photographed projected on the right-eye image data 364a and the diameter 13 of the subject to be photograph projected on the left-eye image data 364b, only the left-eye image data 364b is reduced to obtain reduced image data 370. In this case, since image data needs to be magnified to have a size large enough to be displayed on the display unit 108 after reduction, an actual information amount of the left-eye image data 364b is not reduced, but an actual information amount of the partial image data 366 obtained by being cut out from the right-eye image data 364a becomes ¼, thereby leading to image quality degradation.

Accordingly, when the diameter α of the subject to be photographed projected on the right-eye image data 364a is 1 and the diameter β of the subject to be photographed projected on the left-eye image data 364b is 2 (ratio β/α=2) as shown in (a) of FIG. 10, under the control of the cutout control unit 354, the cutout processing unit 326 generates magnified/reduced image data 372a obtained by multiplying the right-eye image data 364a by an average value obtained by dividing a sum of β/α and 1 by 2, that is, $\{(\beta/\alpha)+1\}/2=(\alpha+\beta)/2\alpha=1.5$, and magnified/reduced image data 372b obtained by multiplying the left-eye image data 364b by an average value obtained by dividing a sum of β/α and 1 by 2, that is, $\{(\beta/\alpha)+1\}/2=(\alpha+\beta)/2\beta=0.75$ as shown in (b) of FIG. 10. Accordingly, each of the magnified/reduced image data 372a and 372b may suppress a reduction of an actual information amount to ½.

As shown in (c) of FIG. 10, the cutout processing unit 326 outputs the magnified/reduced image data 372b as image data viewed with the left eye to the image combining unit 128, and cuts out partial image data 374a having the same size as the magnified/reduced image data 372b from the magnified/reduced image data 372a and outputs the partial image data 374a as image data viewed with the right eye to the image combining unit 128.

As such, since the cutout control unit 354 controls the cutout processing unit 326 to proportionately divide a dimension ratio of a subject to be photographed and perform magnification/reduction correction on any one of the two pieces of image data (the right-eye image data 364a and the left-eye image data 364b), a difference in image quality between the two pieces of image data caused by magnifying only one image data may be removed and a sharp reduction of an actual information amount caused by reducing only one image data may also be suppressed. Accordingly, the apparatus 300 of the present embodiment may suppress a reduction of information between pieces of image data and uniformize image quality, thereby reducing image quality degradation of a stereoscopic image.

Also, although the cutout processing unit 326 of the present embodiment performs magnification/reduction correction on image data and then cuts out partial image data under the control of the cutout control unit 354, the present embodiment is not limited thereto and partial image data may be cut out from image data and then magnification/reduction correction may be performed.

While appropriate embodiments of the present invention have been particularly shown and described with reference to the attached drawings, the embodiments and terms have been used to explain the present invention and should not be construed as limiting the scope of the present invention defined by the claims. Accordingly, it will be understood by those of ordinary skill in the art that various changes in form and details may be made therein without departing from the spirit and scope of the present invention as defined by the following claims.

For example, when a differential between a difference between a reference axis and an actual imaging axis of the imaging unit 120a and a difference between a reference axis and an actual imaging axis of the imaging unit 120b are within an allowable range, imaging axis correction described in the first embodiment may not be performed and only magnification/reduction correction described in the second embodiment may be performed.

INDUSTRIAL APPLICABILITY

The present invention may be applied to an apparatus for capturing a stereoscopic image which a viewer may sense.

LIST OF REFERENCE NUMERALS 100, 300: apparatus for capturing a stereoscopic image
104: imaging tens
110a, 110b: imaging axis
120 (120a, 120b): imaging unit
126, 326: cutout processing unit
132, 332: information storage unit
140: zoom lens (lens capable of magnifying and reducing a subject to be photographed)
142: focus lens
152, 352: correction value generating unit
154, 354: cutout control unit

The invention claimed is:
1. An apparatus for capturing a stereoscopic image, the apparatus comprising:
imaging units which generate right-eye image data and left-eye image data having binocular parallax for making a viewer sense a stereoscopic image;
an information storage unit which stores, when image center points of the right-eye image data and the left-eye image data are origins, position information indicating a position of a right correction point obtained by moving a mark projected on in the right-eye image data by a differential vector and a position of a left correction point obtained by moving a mark projected on the left-eye image data by the differential vector, wherein the differential vector is a vector having a center point of a connection line that connects the marks projected on the right-eye image data and the left-eye image data as an initial point and the image center points as terminal points; and a cutout control unit which, based on the position information, cuts out pieces of partial image data having the same size by using the right correction point as a cutout center from the right-eye image data and the left correction point as a cutout center from the left-eye image data.

2. The apparatus of claim 1, wherein the imaging units comprise lenses capable of magnifying and reducing a subject to be photographed on an imaging axis for generating the right-eye image data and an imaging axis for generating the left-eye image data, the information storage unit stores the position information when the lenses are set to have a plurality of different magnifications, in relation to the magnifications, and the cutout control unit obtains a magnification of a current lens, and based on position information in relation to the magnification of the current lens, cuts out pieces of partial image data having the same size from the right-eye image data and the left-eye image data.

3. The apparatus of claim 1, wherein the imaging units comprise lenses capable of magnifying and reducing a subject to be photographed on an imaging axis for generating the right-eye image data and an imaging axis for generating the left-eye image data, the information storage unit stores ratio information indicating a dimension ratio of the same subject to be photographed projected on the right-eye image data and the left-eye image data generated by the imaging unit, and the cutout control unit multiplies an average value, which is obtained by dividing a sum of a ratio indicated by the ratio information and 1 by 2, by any one of the right-eye image data and the left-eye image data, multiplies a value obtained by dividing the average value by the ratio by the image data not divided by the average value, and cuts out pieces of partial image data having the same size from the image data divided by the average value and the image data divided by the value obtained by dividing the average in value by the ratio.

4. The apparatus of claim 3, wherein the information storage unit stores the ratio information when the lenses are set to have a plurality of different magnifications, in relation to the magnifications, and the cutout control unit obtains a magnification of a current lens, and based on ratio information in relation to the magnification of the current lens, cuts out pieces of partial image data having the same size from the image data divided by the average value and the image data divided by the value obtained by dividing the average value by the ratio.

* * * * *